(12) United States Patent
Park et al.

(10) Patent No.: US 9,898,333 B2
(45) Date of Patent: Feb. 20, 2018

(54) METHOD AND APPARATUS FOR SELECTING PREEMPTION TECHNIQUE

(71) Applicant: Samsung Electronics Co., Ltd., Suwon-si (KR)

(72) Inventors: Jason Jong Kyu Park, Ann Arbor, MI (US); Scott Mahlke, Ann Arbor, MI (US); Donghoon Yoo, Suwon-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 0 days.

(21) Appl. No.: 14/821,094

(22) Filed: Aug. 7, 2015

(65) Prior Publication Data
US 2016/0179572 A1 Jun. 23, 2016

(30) Foreign Application Priority Data
Dec. 23, 2014 (KR) .................. 10-2014-0187503

(51) Int. Cl.
*G06F 9/46* (2006.01)
*G06F 9/48* (2006.01)

(52) U.S. Cl.
CPC ............ *G06F 9/485* (2013.01); *G06F 9/4881* (2013.01)

(58) Field of Classification Search
None
See application file for complete search history.

(56) References Cited

U.S. PATENT DOCUMENTS

| 7,203,823 B2 | 4/2007 | Albuz et al. | |
| 7,721,291 B2 | 5/2010 | McKenney | |
| 8,589,943 B2 | 11/2013 | Bates | |
| 2003/0005252 A1* | 1/2003 | Wilson | G06F 9/4881 711/167 |
| 2010/0274941 A1* | 10/2010 | Wolfe | G06F 9/5033 710/269 |
| 2014/0022266 A1* | 1/2014 | Metz | G06F 9/4806 345/522 |
| 2014/0176577 A1 | 6/2014 | Meixner | |
| 2014/0184617 A1 | 7/2014 | Palmer et al. | |

OTHER PUBLICATIONS

Hind, M., "Pointer analysis: haven't we solved this problem yet?," Proceedings of the 2001 ACM SIGPLAN-SIGSOFT workshop on Program analysis for software tools and engineering, 2001 (8 pages).
Adriaens, J. et al., "The case for GPGPU spatial multitasking," IEEE 18th International Symposium on High Performance Computer Architecture (HPCA), 2012 (12 pages).

(Continued)

*Primary Examiner* — Lewis A Bullock, Jr.
*Assistant Examiner* — Melissa Alfred
(74) *Attorney, Agent, or Firm* — F. Chau & Associates, LLC

(57) ABSTRACT

Provided is a method and apparatus of selecting a preemption technique for a computation unit included in a processor to execute a second task before the at least one computation unit finishes executing a first task. The method includes receiving a preemption request, predicting a cost of preemption techniques based on a progress of the first task until receipt of the preemption request, and selecting one of the preemption techniques based on the predicted cost.

20 Claims, 14 Drawing Sheets

(56) References Cited

OTHER PUBLICATIONS

Basaran, C. et al., "Supporting preemptive task executions and memory copies in GPGPUs," IEEE 24th Euromicro Conference on Real-Time Systems (ECRTS), 2012, (10 pages).

Menon, J. et al., "iGPU: exception support and speculative execution on GPUs," ACM SIGARCH Computer Architecture News. vol. 40. No. 3. IEEE Computer Society, 2012 (12 pages).

Tanasic, I. et al., "Enabling preemptive multiprogramming on GPUs," Proceeding of the 41st annual international symposium on Computer architecture, IEEE Press, 2014 (12 pages).

* cited by examiner

METHOD AND APPARATUS FOR SELECTING PREEMPTION TECHNIQUE

CROSS-REFERENCE TO RELATED APPLICATION(S)

This application claims the benefit under 35 USC § 119(a) of Korean Patent Application No. 10-2014-0187503, filed on Dec. 23, 2014, in the Korean Intellectual Property Office, the disclosure of which is incorporated herein by reference for all purposes.

BACKGROUND

1. Field

The following description relates to a method and apparatus for selecting a preemption technique.

2. Description of Related Art

Computer systems of today such as, for example, desktops, servers, cellular phones, and tablet PCs adopt Graphics Processing Units (GPUs) to support traditional Central Processing Units (CPUs). In such heterogeneous systems, tasks may be transmitted from a CPU to a GPU in the form of kernels. The GPU may effectively speed up data-parallel kernels with the help of new programming models such as OpenCL.

Meanwhile, heterogeneous systems may include a plurality of CPUs sharing one GPU. When the plurality of CPUs simultaneously transmit data-parallel kernels to the GPU, multi-tasking needs to be supported. In general, multi-tasking on a CPU is performed through context switching. However, a task executed on the GPU has a huge size of a context, such that various problems may occur if preemptive multi-tasking is performed through context switching on the GPU.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Provided are a method and apparatus for selecting a preemption technique.

In one general aspect, there is provided a method of selecting a preemption technique for a computation unit included in a processor to execute a second task before the computation unit finishes executing a first task, the method including receiving a preemption request, predicting a cost of preemption techniques based on a progress of the first task until receipt of the preemption request, and selecting one of the preemption techniques based on the predicted cost.

The preemption techniques may include a first technique where information associated with the first task is stored and the first task is replaced with the second task, a second technique where the second task is executed after execution of the first task is finished, and a third technique where the first task is immediately replaced with the second task without storing the information associated with the first task.

The cost may include a throughput overhead and a preemption latency, and the predicting of the cost may include predicting the throughput overhead and the preemption latency for each preemption technique of the preemption techniques.

The selecting of the preemption technique may include selecting the preemption technique having a smallest throughput overhead among the preemption techniques.

The selecting of the preemption technique may include selecting a preemption technique having a smallest preemption latency among the preemption techniques.

The method may include receiving a user input for selecting one of throughput overhead and preemption latency, wherein the selecting of one of the preemption techniques comprises selecting the preemption technique having a lowest cost corresponding to the user input among the predetermined preemption techniques.

The predicting of the cost may include predicting the cost based on a number of Single Instruction Multiple Data (SIMD) instructions that have been executed in the first task and an average Instructions-Per-Clock (IPC) of the first task.

The method may include assigning the second task to at least one computation unit according to the selected preemption technique.

The receiving of the preemption request may include receiving information regarding which kernel is to be preempted, how many computation units are to be preempted, and at least one of a preemption latency limiting condition or a throughput overhead limiting condition.

According to another there is provided an apparatus for selecting a preemption technique for a computation unit included in a processor to execute a second task before the computation unit finishes executing a first task, the apparatus including a selector configured to receive a preemption request, and a predictor configured to predict a cost of preemption techniques based on a progress of the first task until receipt of the preemption request, wherein the selector is further configured to select one of the preemption techniques based on the predicted cost.

The preemption techniques may include a first technique where information associated with the first task is stored and the first task is replaced with the second task, a second technique where the second task is executed after execution of the first task is finished, and a third technique where the first task is immediately replaced with the second task without storing the information associated with the first task.

The cost may include a throughput overhead and a preemption latency, and the predictor is further configured to predict the throughput overhead and the preemption latency for each preemption technique of the preemption techniques.

The selector may be further configured to select a preemption technique having a smallest throughput overhead among the preemption techniques.

The selector may be further configured to select a preemption technique having a smallest preemption latency among the preemption techniques.

The selector may be further configured to receive a user input for selecting one of throughput overhead and preemption latency and to select one of the preemption techniques having a lowest cost corresponding to the user input among the preemption techniques.

The predictor may be further configured to predict the cost based on a number of Single Instruction Multiple Data (SIMD) instructions that have been executed in the first task and an average Instructions-Per-Clock (IPC) of the first task.

The predictor may be further configured to receive information comprising at least one of processing-finished task, SIMD instruction progress statistics for each task, a start point of a non-idempotent region from the computation unit and to predict the cost based on the received information.

The apparatus may include a scheduler configured to assign the second task to at least one computation unit according to the selected preemption technique.

Other features and aspects will be apparent from the following detailed description, the drawings, and the claims.

Figure 1:
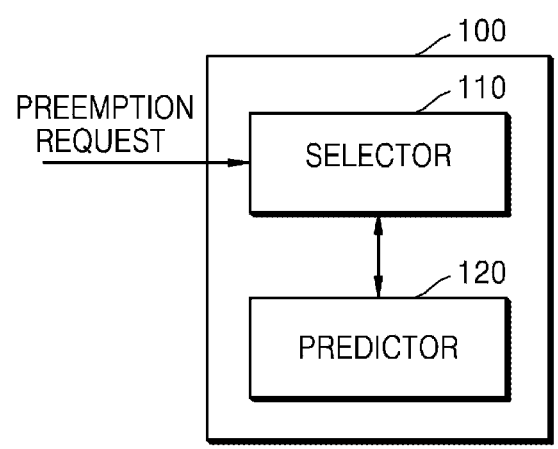
FIG. 1 is a diagram illustrating an example of an apparatus for selecting a preemption technique.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses, and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

FIG. 1 is a diagram illustrating an example of an apparatus 100 for selecting a preemption technique. Referring to FIG. 1, the apparatus 100 for selecting a preemption technique (or a preemption technique selecting apparatus 100) may include a selector 110 and a predictor 120. While components related to the present example are illustrated in the preemption technique selecting apparatus 100, it is understood that those skilled in the art may include other general components. In another example, the selector 110 and the predictor 120 of the preemptive technique selecting apparatus 100 illustrated in FIG. 1 may be provided as independent devices.

The selector 110 and the predictor 120 may correspond to one processor or a plurality of processors. Each of the processors may be implemented with an array of multiple logic gates, or a combination of a general-purpose microprocessor and a memory having stored therein a program to be executed by the microprocessor. Also, it would be understood by those of ordinary skill in the art that the processor may be implemented with other types of hardware.

The selector 110 receives a preemption request. The selector 110 selects one preemption techniques. Herein, preemption means an event in which a first task being currently executed in a computation unit is replaced with a second task. In other words, preemption means an event in which as the second task is input prior to completion of the first task in the computation unit, execution of the first task is stopped and the second task is executed.

The preemption request may be received from the outside of the preemption technique selecting apparatus 100. For example, the preemption request may be transmitted from an operating system. Assuming that the preemption technique selecting apparatus 100 is included in a Graphics Processing Unit (GPU), the preemption request may be transmitted from a Central Processing Unit (CPU) located outside the GPU.

The preemption request may include which kernel is to be preempted, how many computation units are to be preempted, and a preemption latency limiting condition or a throughput overhead limiting condition. Herein, the preemption latency limiting condition means a limit condition of a latency time occurring when preemption is carried out. For example, if the preemption latency limiting condition is 1 ms and a latency time occurring due to carrying out preemption is 1.5 ms, then the preemption falls beyond the preemption latency limiting condition.

The throughput overhead limiting condition means a limit condition of a throughput overhead generated due to carrying out preemption. For example, if the throughput overhead limiting condition is 3 and the throughput overhead generated by carrying out preemption is 4, then the preemption may fall beyond the throughput overhead limiting condition.

The selector 110 selects one of the predetermined preemption techniques based on a cost of each of the predetermined preemption techniques. The cost of each predetermined preemption technique is predicted by the predictor 120. The predetermined preemption techniques may include context switching in which a first task is replaced with a second task after information associated with the first task is stored, draining in which the second task is executed after execution of the first task is finished, and flushing in which the first task is immediately replaced with the second task without storing the information associated with the first task. The selector 110 selects one of context switching, draining, and flushing.

The predictor 120 predicts the cost of each preemption technique based on a degree to which the first task has been executed until a preemption request is received. The predictor 120 predicts the cost of each of context switching, draining, and flushing according to a degree to which the first task has been executed until the preemption request is received. The cost means a throughput overhead or a preemption latency generated when preemption is carried out according to a preemption technique. The predictor 120 predicts each of a throughput overhead and a preemption latency generated when preemption is carried out by context switching. The predictor 120 predicts each of a throughput overhead and a preemption latency generated when preemption is carried out by draining. The predictor 120 predicts each of a throughput overhead and a preemption latency generated when preemption is carried out by flushing. The predictor 120 transmits information about the predicted cost to the selector 110, which then selects a preemption technique based on the predicted cost.

Figure 2:
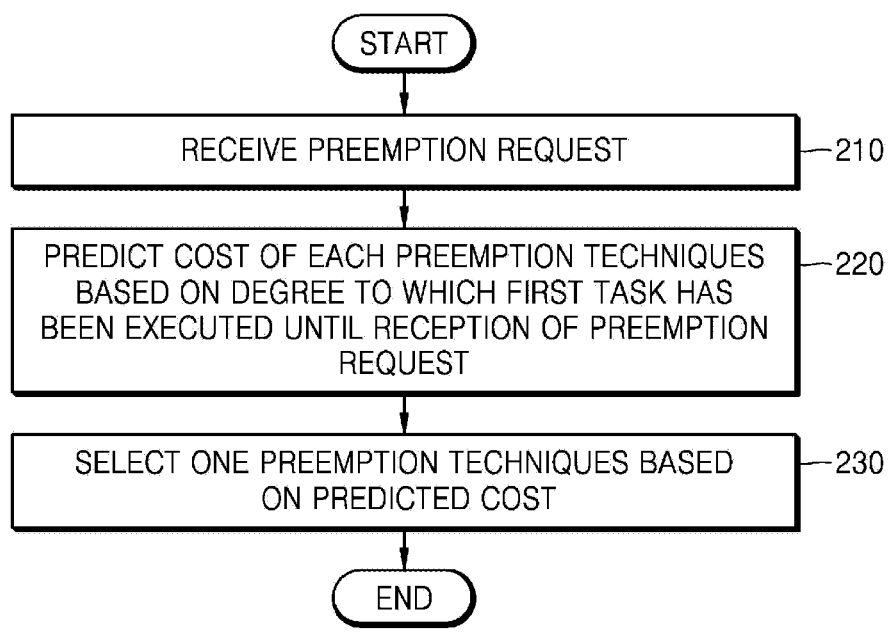
FIG. 2 is a diagram illustrating an example of a method of selecting a preemption technique.

Referring to FIG. 2, operations of the selector 110 and the predictor 120 will be described in further detail. FIG. 2 is a diagram illustrating an example of a method of selecting a preemption technique. The operations in FIG. 2 may be performed in the sequence and manner as shown, although the order of some operations may be changed or some of the operations omitted without departing from the spirit and scope of the illustrative examples described. Many of the operations shown in FIG. 2 may be performed in parallel or concurrently.

Referring to FIG. 2, the preemption technique selecting method may include operations that are processed in time series by the preemption technique selecting apparatus 100 illustrated in FIG. 1. The above descriptions of preemption technique selecting apparatus 100 illustrated in FIG. 1 is also applicable to FIG. 2, and is incorporated herein by reference. Thus, the above description may not be repeated here.

In operation 210, the selector 110 receives a preemption request. The preemption request may include information regarding which kernel is to be preempted, how many computation units are to be preempted, and a preemption latency limiting condition or a throughput overhead limiting condition. Preemption will be described in detail with reference to FIGS. 3 and 4.

Figure 3:
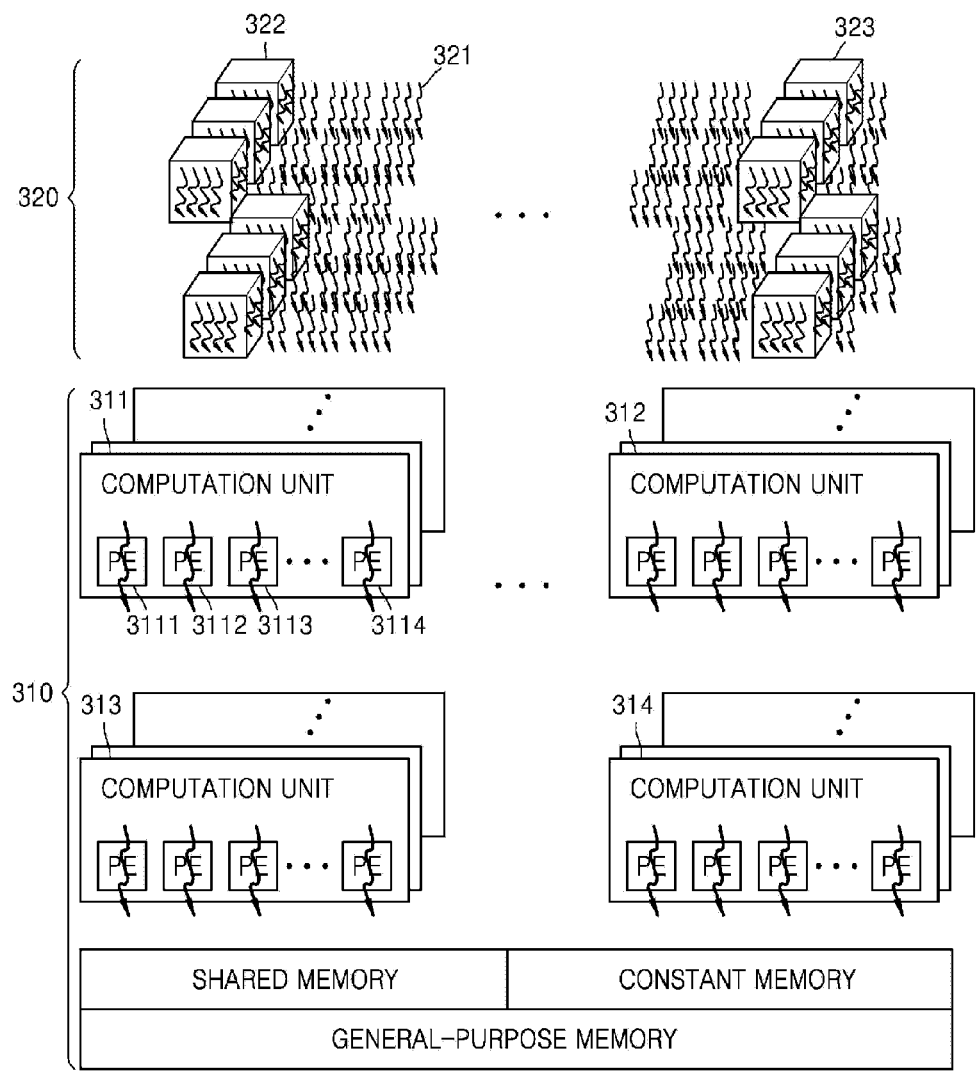
FIG. 3 is a diagram illustrating an example of a kernel.

FIG. 3 is a diagram illustrating an example of a task. FIG. 3 illustrates an example of the operation of a data-parallel kernel according to OpenCL.

A computing device (for example, a CPU or GPU) 310 processes a plurality of processes or a plurality of threads in parallel. For example, if the computing device 310 is a GPU, a plurality of computation units 311, 312, 313, and 314 included in the GPU may process a plurality of threads 321 included in input data 320 in parallel.

For example, the input data 320 may include Single Instruction Multiple Data (SIMD) instructions. Some of the plurality of threads 321 included in the input data 320 may form one task group 322. The task group 322 means a virtual unit including threads corresponding to the same instruction, i.e., the threads included in the task group 322 correspond to the same instruction, but data included in each thread differs from thread to thread.

The computation unit 311 included in the computing device 310 processes one task group 322. For example, the computation unit 311 may include a plurality of processing elements 3111, 3112, 3113, and 3114, each of which processes one of the threads included in the task group 322.

When the computation unit 311 is processing one task group 322, i.e., executes the first task, the computation unit 311 may be requested to process another task group, task group 323, i.e., to execute the second task, which is called preemption of the computation unit 311. Preemption will be described below in detail with reference to FIG. 4.

Figure 4:
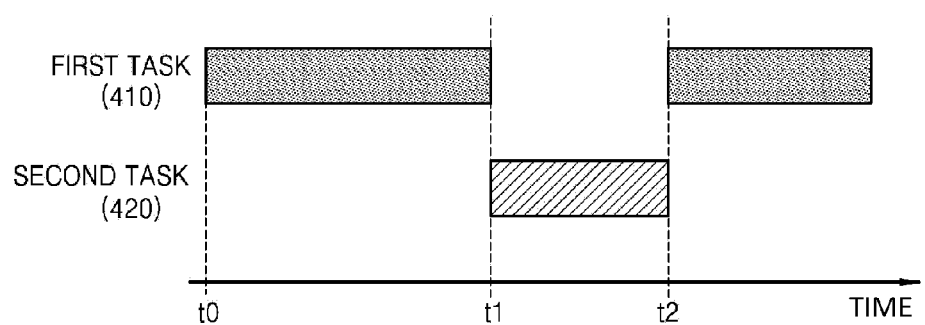
FIG. 4 is a diagram illustrating an example of preemption.

FIG. 4 is a diagram illustrating an example of preemption. FIG. 4 illustrates a process of processing a task by the computation unit 311 illustrated in FIG. 3. A first task 410 and a second task 420 illustrated in FIG. 4 may correspond to the task groups 322 and 323 illustrated in FIG. 3.

During processing of the first task 410 by the computation unit 311, a request for processing the second task 420 is received. For example, the computation unit 311 may start processing the first task 410 and receive the request for processing the second task 420 at t1. This is referred to as preemption of the computation unit 311 for processing of the second task 420. At t1, the computation unit 311 stops processing the first task 410 and starts processing the second task 420. Once the computation unit 311 finishes processing the second task 420 at t2, the computation unit 311 resumes processing the first task 410.

The process of replacing the first task 410 with the second task 420 may be performed by context switching, draining, or flushing. For example, the computation unit 311 may process the second task 420 after storing all information (for example, registers) required for execution of the first task 410 in a memory at t1. In another example, the computation unit 311 may process the second task 420 after processing the first task 410 is completed. In further another example, at t1, the computation unit 311 may immediately replace the first task 410 with the second task 420, without storing information required for execution of the first task 410, and start processing the second task 420. Further description of context switching, draining, and flushing is made with reference to FIGS. 5 to 7.

Figure 5:
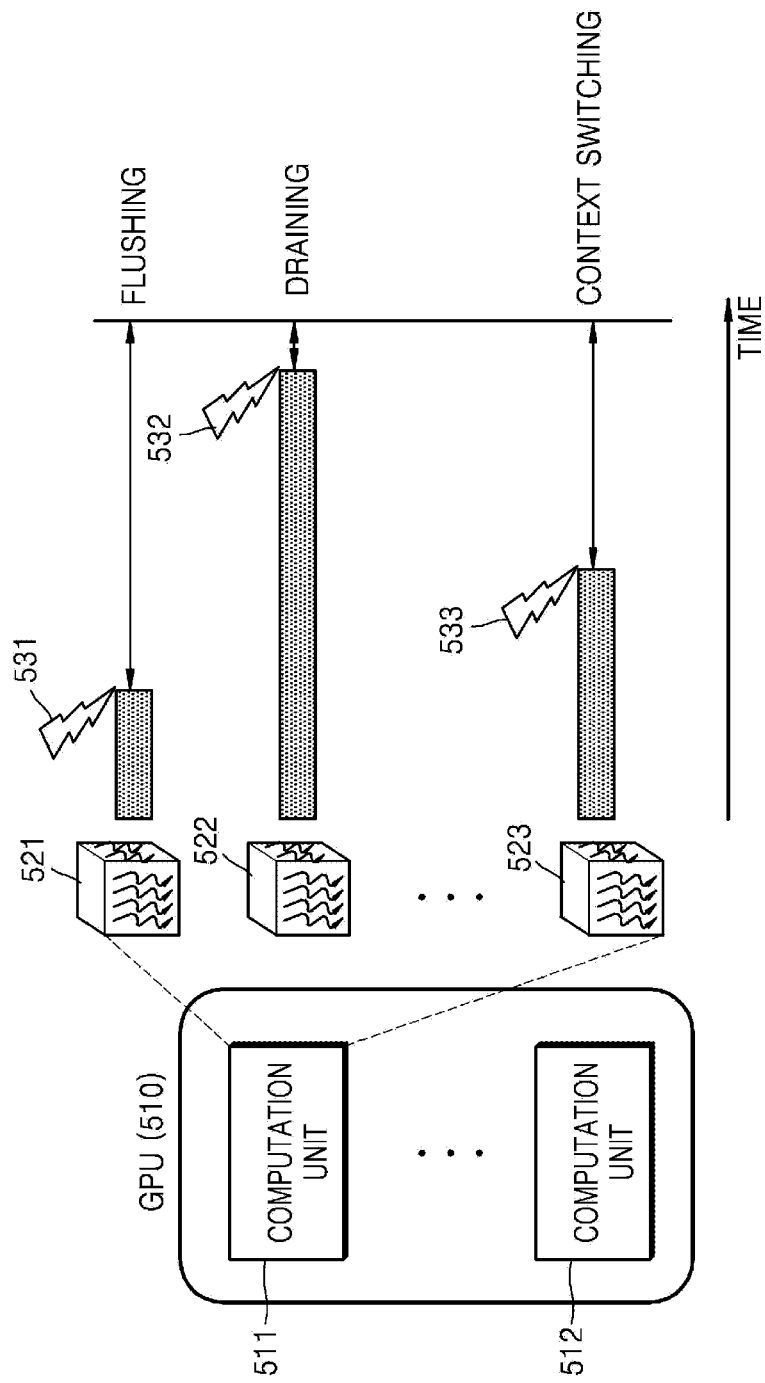
FIG. 5 is a diagram illustrating examples of a preemption technique.

FIG. 5 is a diagram illustrating examples of a preemption technique. In general, a GPU 510 may include a plurality of computation units 511 and 512, each of which processes a task. The computation unit 511 cannot process two tasks at the same time. Thus, if the computation unit 511 receives a request for processing a second task (that is, a preemption request) while processing a first task, the computation unit 511 needs to replace the first task with the second task. In this case, various preemption techniques may be used.

The selector 110 selects a proper preemption technique based on a cost of each preemption techniques. The cost may be predicted based on a degree to which the first task has been executed until the request for processing the second task is received.

In performing preemption using flushing, a first task 521 is immediately replaced with a second task without storing information associated with the first task 521 upon receipt of a preemption request 531. Thus, if the preemption request 531 is received at a point in time at which the computation unit 511 does not process the first task 521 much, i.e., most of the first task 521 remains to be processed, it may be desirable to select flushing.

In performing preemption using draining, a second task is executed after execution of a first task 522 is finished, in spite of receipt of a preemption request 532. Thus, if the preemption request 532 is received at a point in time at which the computation unit 511 has processed most part of the first task 522, i.e., little of the first task 522 remains to be processed, it may be desirable to select draining.

In performing preemption using context switching, upon receipt of a preemption request 533, information associated with a first task 523 is stored and then the first task 523 is replaced with a second task. Context switching separately stores the information associated with the first task 523, whereas flushing immediately replaces the first task 521 with the second task without separately storing the information associated with the first task 521. Thus, if the point in time at which the preemption request 533 is received is not a desirable point in time to select either flushing or draining, it may be desirable to select context switching.

Figure 6:
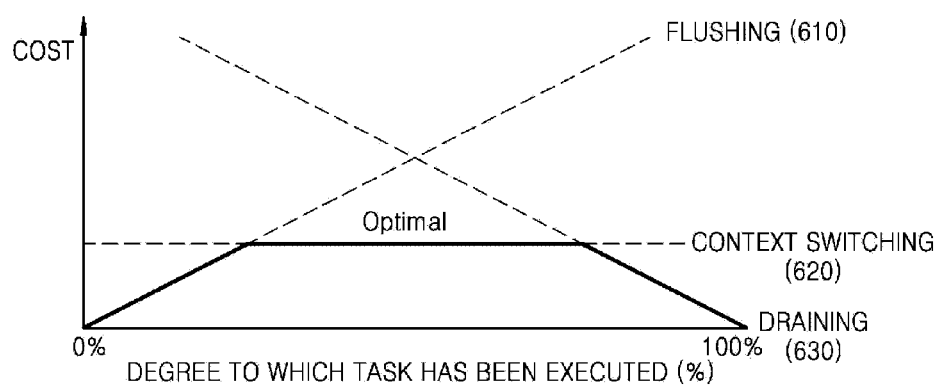
FIG. 6 is a diagram illustrating an example of a point in time in which preemption techniques are selected.

FIG. 6 is a diagram illustrating an example of a point in time in which preemption techniques are selected. FIG. 6 illustrates a cost of a preemption technique with respect to a degree to which a first task has been executed by a computation unit.

In flushing 610, a cost increases as a degree to which a first task has been executed increases. According to the flushing 610, if a preemption request is received, the first task is immediately replaced with a second task without storing information associated with the first task. The computation unit resumes executing the first task from the beginning after execution of the second task is finished. Thus, the flushing 610 is desirable to use if a preemption request is received at a point in time at which a degree to which the first task has been executed is low.

In draining 630, a cost decreases as a degree to which the first task has been executed increases. According to the draining 630, the second task is executed after execution of the first task is finished. Thus, the draining 630 is desirable to use if a preemption request is received at a point in time at which a degree to which the first task has been executed is high.

Context switching 620 has a constant cost regardless of a degree to which the first task has been executed. According to the context switching 620, the second task is executed after information associated with the first task is stored, such that after execution of the second task is finished, the computation unit may resume executing the first task from the stopped part of the first task. Thus, the context switching 620 has a constant cost regardless of a degree to which the first task has been executed until receipt of the preemption request.

The selector 110 selects a preemption technique having the lowest cost at the time of receipt of the preemption request, based on the cost of each of the above-described three preemption techniques. Thus, the preemption technique selecting apparatus 100 may select the most proper preemption technique at the current point in time, and thus the computation unit may be preempted with low overhead.

Figure 7:
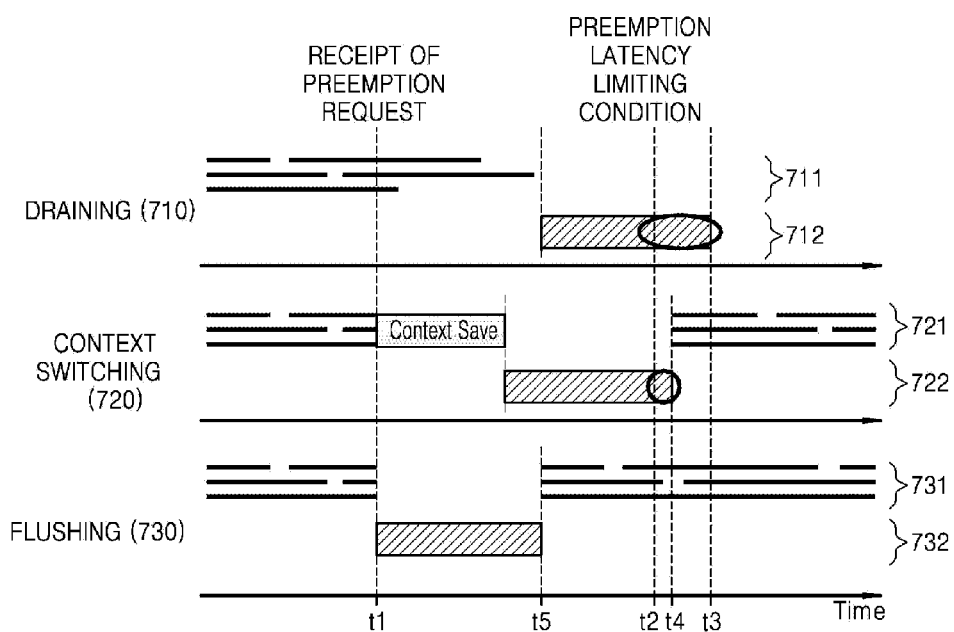
FIG. 7 is a diagram illustrating an example of a preemption latency limiting condition.

Meanwhile, the preemption request may include a preemption latency limiting condition. Herein, the preemption latency limiting condition means a limiting condition for a latency time generated due to carrying out preemption. With reference to FIG. 7, the preemption latency limiting condition will be described.

FIG. 7 is a diagram illustrating an example of a preemption latency limiting condition. In the description of FIG. 7, it is assumed that a preemption request is received at t1 and a preemption latency limiting condition indicates t2.

Draining 710 finishes processing a first task 711 in spite of receipt of the preemption request. Thus, a second task 712 is processed after processing of the first task 711 is finished. Assuming that both processing of the first task 711 and processing of the second task 712 are finished at t3, and t3 is greater than t2, then the draining 710 fails to satisfy a preemption latency limiting condition. Hence, the selector 110 does not select the draining 710 as a preemption technique.

Context switching 720 stores information associated with a first task 721 upon receipt of the preemption request, and then executes a second task 722. Assuming that at t4, the information associated with the first task 721 is stored and processing of the second task 722 is finished, and t4 is greater than t2, then the context switching 720 fails to satisfy the preemption latency limiting condition. Hence, the selector 110 does not select the context switching 720 as a preemption technique.

Flushing 730 replaces a first task 731 with a second task 732 immediately upon receipt of the preemption request, without storing information associated with the first task 731. If execution of the second task 732 is finished, execution of the first task 731 is resumed from the beginning. Assuming that processing of the second task 732 is finished at t5 and t5 is lesser than t2, then the flushing 730 satisfies the preemption latency limiting condition. Hence, the selector 110 may select the flushing 730 as a preemption technique.

Figure 8:
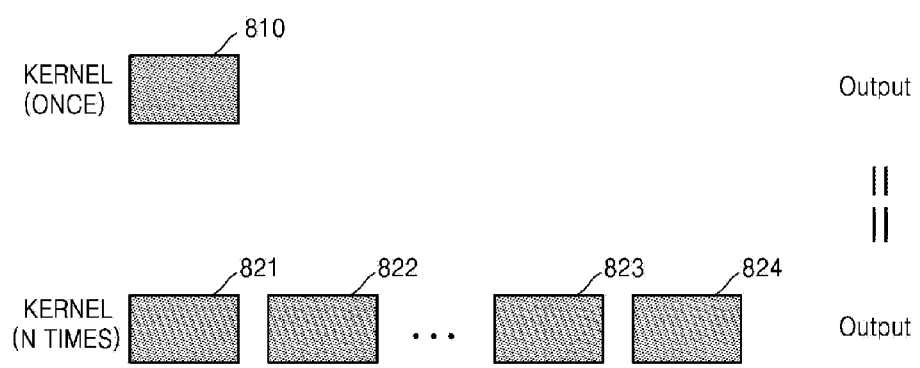
FIGS. 8 and 9 are diagrams illustrating examples of idempotence.
Figure 9:
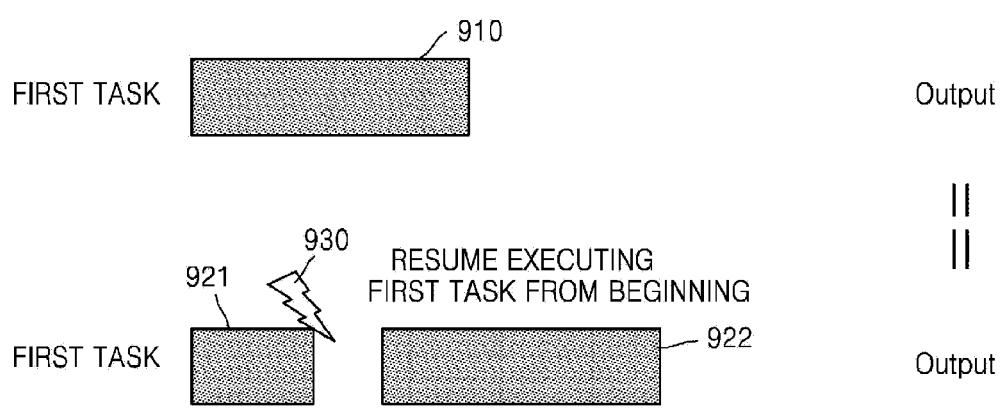
Figure 10:
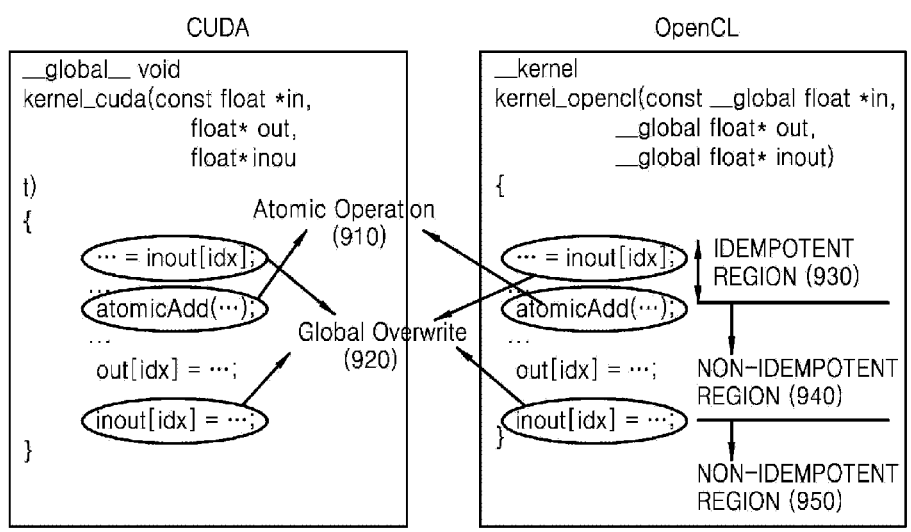
FIG. 10 is a diagram illustrating an example of an idempotent region included in a first task.

Meanwhile, in flushing 730, since execution of the first task 731 resumes from the beginning when execution of the second task 732 is finished, it is important to identify an idempotent region of the first task 731. With reference to FIGS. 8 to 10, the meaning of idempotence and an idempotent region will be described.

FIGS. 8 and 9 are diagrams illustrating examples of idempotence. FIG. 8 shows processing results 810, 821, 822, 823, and 824 with respect to a task by a kernel. It can be seen from FIG. 8 that the task processing result 810 when the kernel operates once is identical to each of the task processing results 821, 822, 823, and 824 when the kernel operates n times. In other words, the task processing result 810 when the kernel operates once is identical to the task processing result 821 when the kernel operates first among the n times. In addition, the task processing result 821 when the kernel operates first among the n times is identical to the task processing result 822 when the kernel operates second among the n times.

As such, regardless of whether the kernel operates once or n times, the identical result may be output whenever the kernel operates, which is called idempotence.

FIG. 9 illustrates a result 910 of processing a first task by a computation unit and a result 922 of stopping a first task 921 processed previously upon receipt of a preemption request 930 and resuming processing of the first task.

If processing of a first task is stopped in an idempotent region of a first task upon receipt of the preemption request 930, the result 910 of processing the first task without stopping processing the first task is identical to the result 922 of resuming processing the first task. However, if processing of the first task is stopped in a non-idempotent region of the first task upon receipt of the preemption request 930, the result 910 of processing the first task without stopping processing the first task is different from the result 922 of resuming processing the first task. Thus, if preemption is carried out using flushing, processing of the first task needs to be stopped in the idempotent region of the first task.

FIG. 10 is a diagram illustrating an example of an idempotent region included in a first task.

On the left side of FIG. 10, an example of a first task made using CUDA is illustrated, and on the right side of FIG. 10, an example of a first task made using OpenCL is illustrated.

An idempotent region and a non-idempotent region of a first task may be identified using an instruction included in the first task. For example, it is assumed that the first task involves, after reading data A stored in a memory, adding data B to the data A to generate data C, and updating the data A to the data C. If a computation unit stops processing the first task after updating the data A with the data C, and then resumes the first task from the beginning, then data read for the first time from the memory is not the data A, but the data C. Thus, a part of the first task, following an instruction for updating the data A with the data C, is a non-idempotent region.

'atomicAdd( . . . )' of a first task made using CUDA and 'atomic_add( . . . )' of the first task made using OpenCL are examples of an atomic operation 910. A part of the first task preceding processing of the atomic operation 910 is an idempotent region 930. Thus, in the idempotent region 930, even if processing of the first task is stopped and then resumed, the processing result is identical to the result of finishing processing the first task without stopping processing the first task.

Meanwhile, a part of the first task, following processing of the atomic operation 910, corresponds to non-idempotent regions 940 and 950. Thus, if processing of the first task is stopped and then resumed in the non-idempotent regions 940 and 950, the processing result is different from the result of finishing processing the first task without stopping processing the first task.

Referring back to FIG. 2, in operation 220, the predictor 120 predicts a cost of each predetermined preemption technique based on a degree to which a first task has been executed until receipt of a preemption request. Herein, the cost may be predicted in terms of a throughput overhead and a preemption latency.

In other words, the predictor 120 predicts a throughput overhead cost and a preemption latency cost for context switching. The predictor 120 predicts a throughput overhead cost and a preemption latency cost for draining. The predictor 120 predicts a throughput overhead cost and a preemption latency cost for flushing.

The predictor 120 predicts the above-described cost by using the number of Single Instruction Multiple Data (SIMD) instructions that have already been executed among SIMD instructions included in the first task and an average Instructions-Per-Clock (IPC) of the first task.

The predictor 120 predicts a preemption latency of context switching by dividing a size of a context of the first task by a memory bandwidth of a computation unit. The context of the first task refers to information associated with the first task and may include registers of the first task. The predictor 120 may determine an average IPC of the first task as a throughput overhead of context switching, and may determine the average IPC of the first task to be twice a preemption latency of context switching. According to context switching, not only a process of storing the information associated with the first task, but also a process of reading the information associated with the first task is required. Thus, the throughput overhead of the context switching is twice the preemption latency of context switching.

The predictor 120 determines remaining cycles of the first task, i.e., cycles that have not yet been processed, as a preemption latency of draining. The predictor 120 computes a throughput overhead of draining by summing up a difference in the number of already-executed SIMD instructions of each task and a minimum value among the SIMD instructions, i.e., the already-executed SIMD instructions of each task. For example, it is assumed that the number of already-executed SIMD instructions of a third task is 10 and the number of already-executed SIMD instructions of a fourth task is 13. Then, the predictor 120 sums up a difference between 10 and 13 and 10, thus computing a throughput overhead of draining.

The predictor 120 determines a preemption latency of flushing as 0. Flushing immediately replaces a first task with a second task upon receipt of a preemption request. Thus, unlike context switching, flushing does not store information associated with the first task, such that the preemption latency of flushing may be determined as 0. The predictor 120 may determine the number of already-executed SIMD instructions as a throughput overhead of flushing. For example, it is assumed that the number of already-executed SIMD instructions of the third task is 10 and the number of already-executed SIMD instructions of the fourth task is 13. In this case, the predictor 120 may compute the throughput overhead of flushing by summing up 10 and 13.

The predictor 120 receives information needed for cost computation from each of the computation units. For example, each computation unit may transmit information such as a processing-finished task, SIMD instruction progress statistics for each task, a start point of a non-idempotent region, and the like, to the predictor 120. The predictor 120 may predict a cost of each preemption technique by using information transmitted from the computation units.

In operation 230, the selector 110 selects one of the predetermined preemption techniques based on the predicted cost.

For example, the selector 110 selects a preemption technique corresponding to the smallest throughput overhead, by taking into account costs predicted for the preemption techniques. In another example, the selector 110 may select a preemption technique corresponding to the smallest preemption latency, by taking into account the cost of each preemption technique. In further another example, the selector 110 receives a user input of selecting one of a throughput overhead and a preemption latency and selects a preemption technique having the lowest cost corresponding to the user input. In other words, if the user selects the throughput overhead, the selector 110 selects a preemption technique having the smallest throughput overhead among the preemption techniques.

The selector 110 may further take into account whether a preemption latency limiting condition or a throughput overhead limiting condition is satisfied, when selecting one of the preemption techniques.

Figure 11:
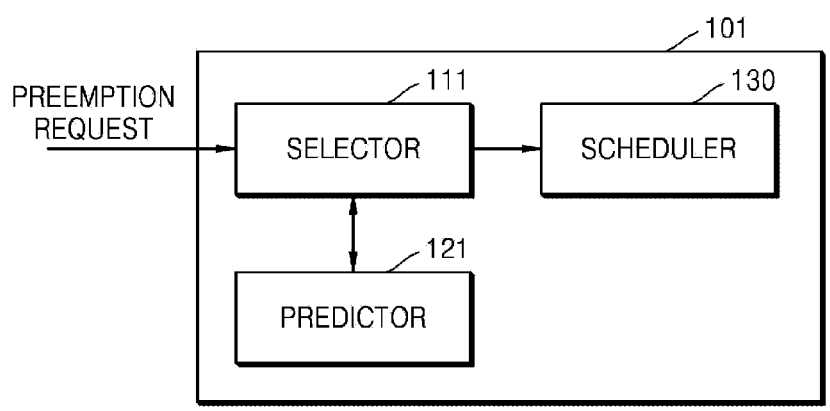
FIG. 11 is a diagram illustrating an example of an apparatus for selecting a preemption technique.

FIG. 11 is a diagram illustrating another example of a preemption technique selecting apparatus 101.

A selector 111, a predictor 121, and a scheduler 130 illustrated in FIG. 11 may correspond to a single processor or a plurality of processors. Each of the processors may be implemented with an array of multiple logic gates, or a combination of a general-purpose microprocessor and a memory having stored therein a program to be executed by the microprocessor. Also, it would be understood by those of ordinary skill in the art that the processor may be implemented with other types of hardware.

The selector 111 and the predictor 121 may correspond to the selector 110 and the predictor 120 described with reference to FIGS. 1 through 10. The above descriptions of selector 110 and the predictor 120 is also applicable to the selector 111 and the predictor 121 of FIG. 11, and is incorporated herein by reference. Thus, the above description may not be repeated here.

The scheduler 130 assigns a task to each computation unit according to a preemption technique selected by the selector 111. For example, assuming that the selector 111 selects flushing, the scheduler 130 requests each of the computation units to stop processing the current task and assigns a new task to each computation unit.

Figure 12:
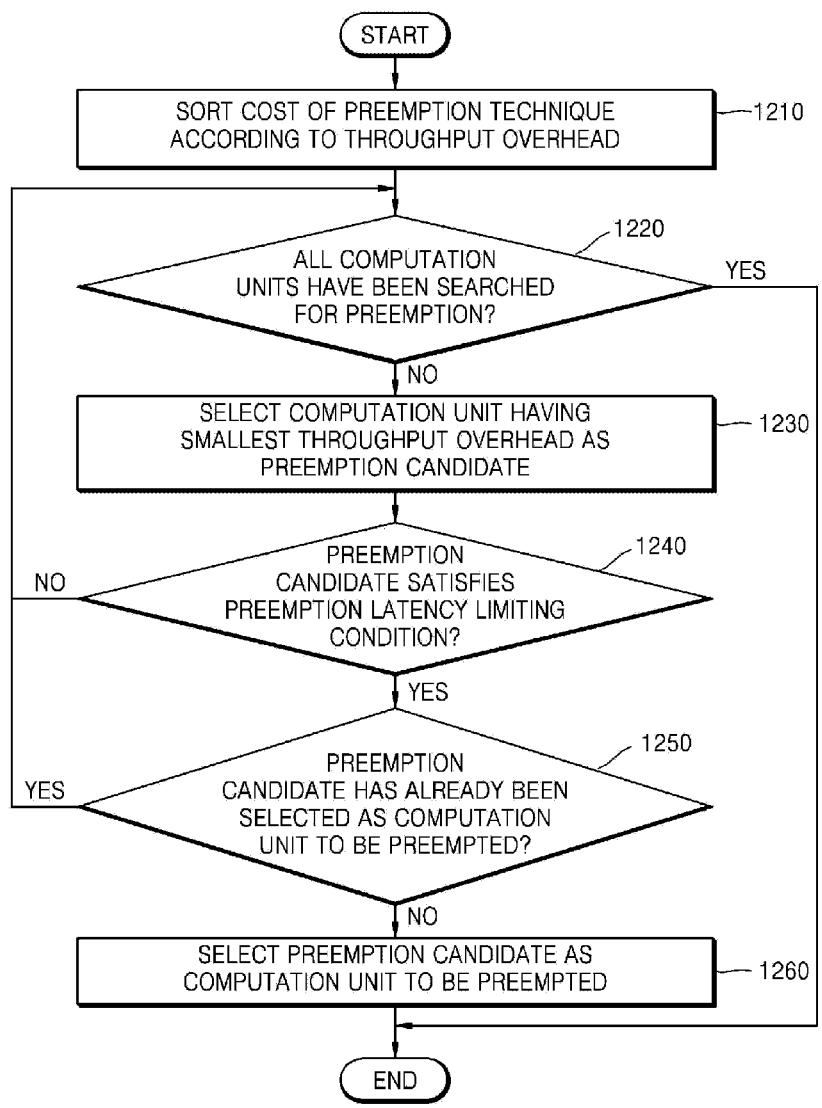
FIGS. 12 and 13 are diagrams illustrating another example of a method of selecting a preemption technique.
Figure 13:
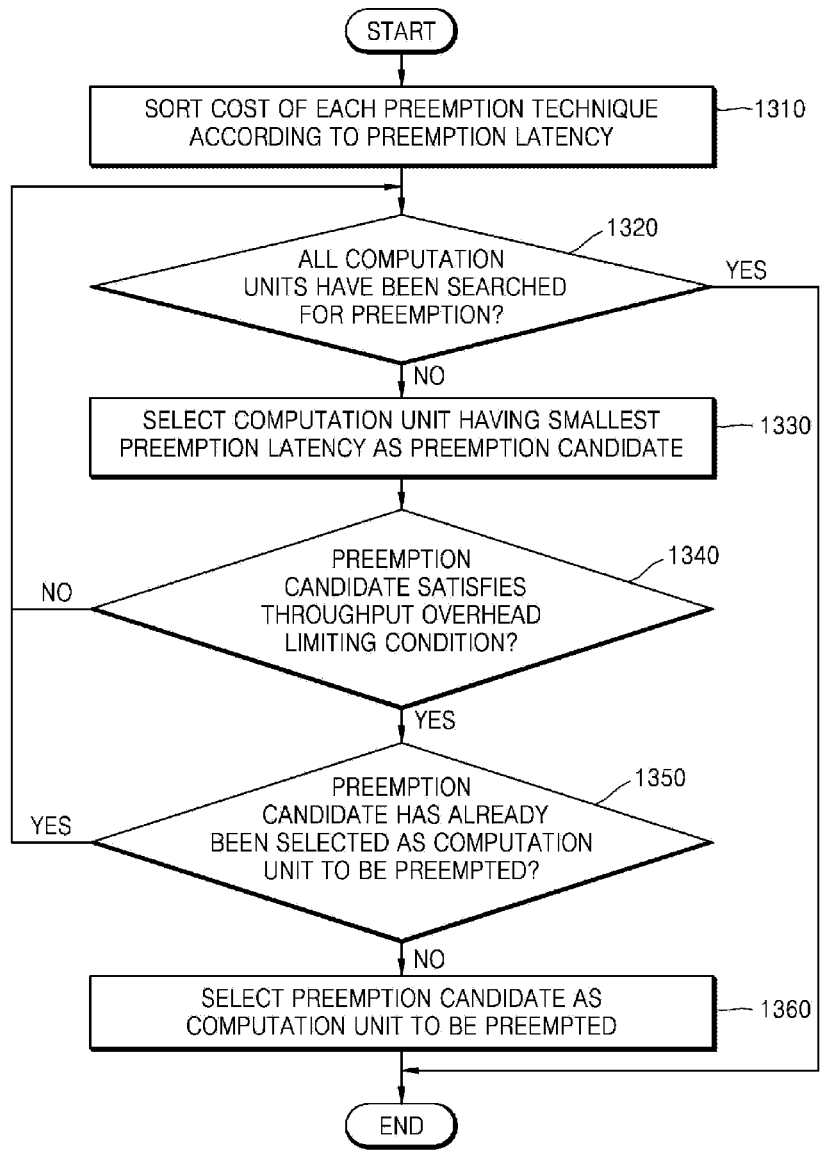

FIGS. 12 and 13 are diagrams illustrating examples of a preemption technique selecting method. The operations in FIGS. 12 and 13 may be performed in the sequence and manner as shown, although the order of some operations may be changed or some of the operations omitted without departing from the spirit and scope of the illustrative examples described. Many of the operations shown in FIGS. 12 and 13 may be performed in parallel or concurrently. The above descriptions of FIGS. 1-11, is also applicable to FIGS.

12 and 13, and is incorporated herein by reference. Thus, the above description may not be repeated here.

Referring to FIGS. 12 and 13, the preemption technique selecting method includes operations processed in time series by the preemption technique selecting apparatuses 100 or 101. Thus, the foregoing description of the preemption technique selecting apparatuses 100 and 101 illustrated in FIGS. 1 and 11 may also be applied to the preemption technique selecting method of FIGS. 12 and 13, and is incorporated herein by reference.

FIG. 12 illustrates an example in which the selectors 110 or 111 select a preemption technique based on a throughput overhead. FIG. 13 illustrates an example in which the selectors 110 or 111 select a preemption technique based on a preemption latency.

First, referring to FIG. 12, in operation 1210, the selectors 110 or 111 sort a cost of each preemption technique based on a throughput overhead. In other words, the selectors 110 or 111 compare throughput overheads generated in computation units according to context switching, draining, and flushing. The selectors 110 or 111 sort context switching, draining, and flushing in the order of throughput overheads generated by the computation units.

In operation 1220, the selectors 110 or 111 determine whether all computation units have been searched for preemption. In other words, the selectors 110 or 111 determine whether carrying out preemption is possible for all computation units. If carrying out preemption is possible for all computation units, the method is terminated and preemption is carried out.

In operation 1230, the selectors 110 or 111 select a computation unit having the smallest throughput overhead as a preemption candidate computation unit.

In operation 1240, the selectors 110 or 111 determine whether the computation unit selected as the preemption candidate satisfies a preemption latency limiting condition. For example, it is assumed that a preemption technique having the largest throughput overhead is context switching, a preemption technique having the next largest throughput overhead is draining, and a preemption technique having the smallest throughput overhead is flushing. The selectors 110 or 111 determine whether the preemption latency limiting condition is satisfied, when preemption is carried out for the computation unit selected as the preemption candidate according to context switching. If preemption latency limiting condition is not satisfied, then the selectors 110 or 111 determine whether the preemption latency limiting condition is satisfied when preemption is carried out according to draining. If the preemption latency limiting condition is not satisfied again, the selectors 110 or 111 determine whether the preemption latency limiting condition is satisfied when preemption is carried out according to flushing.

If all the preemption techniques fail to satisfy the preemption latency limiting condition for the computation unit selected as the preemption candidate, then operation 1220 is performed. Otherwise, operation 1250 is performed.

In operation 1250, the selectors 110 or 111 determine whether the computation unit selected as the preemption candidate has already been selected as a computation unit to be preempted. If the computation unit selected as the preemption candidate has already been selected as the computation unit to be preempted, then operation 1220 is performed. Otherwise, operation 1260 is performed.

In operation 1260, the selectors 110 or 111 select the computation unit selected as the preemption candidate as the computation unit to be preempted. The selectors 110 or 111 notify the scheduler 130 of the selected computation unit.

Referring to FIG. 13, in operation 1310, the selectors 110 or 111 sort costs of respective preemption techniques based on their preemption latencies. In other words, the selectors 110 or 111 compare the preemption latencies to be generated by the computation units with each other according to context switching, draining, and flushing. The selectors 110 or 111 sort context switching, draining, and flushing in the order of the preemption latencies to be generated in the computation units.

In operation 1320, the selectors 110 or 111 determine whether all computation units have been searched for preemption. In other words, the selectors 110 or 111 determine whether carrying out preemption is possible for all the computation units. If carrying out preemption is possible for all the computation units, the method is terminated and preemption is carried out.

In operation 1330, the selectors 110 or 111 select a computation unit having the smallest preemption latency as a preemption candidate computation unit.

In operation 1340, the selectors 110 or 111 determine whether the computation unit selected as the preemption candidate satisfies a throughput overhead limiting condition. For example, it is assumed that a preemption technique having the largest preemption latency is context switching, a preemption technique having the next largest preemption latency is draining, and a preemption technique having the smallest preemption latency is flushing. The selectors 110 or 111 determine whether the throughput overhead limiting condition is satisfied, when preemption is carried out for the computation unit selected as the preemption candidate according to context switching. If the throughput overhead limiting condition is not satisfied, the selectors 110 or 111 determine whether the throughput overhead limiting condition is satisfied, when preemption is carried out for the computation unit selected as the preemption candidate according to draining. If the throughput overhead limiting condition is not satisfied, the selectors 110 or 111 determine whether the throughput overhead limiting condition is satisfied, when preemption is carried out for the computation unit selected as the preemption candidate according to flushing.

If all the preemption techniques fail to satisfy the throughput overhead limiting condition for the computation unit selected as the preemption candidate, operation 1320 is performed. Otherwise, operation 1350 is performed.

In operation 1350, the selectors 110 or 111 determine whether the computation unit selected as the preemption candidate has already been selected as a computation unit to be preempted. If the computation unit selected as the preemption candidate has already been selected as a computation unit to be preempted, operation 1320 is performed. Otherwise, operation 1360 is performed.

In operation 1360, the selectors 110 or 111 select the computation unit selected as the preemption candidate as the computation unit to be preempted. The selectors 110 or 111 notify the scheduler 130 of the selected computation unit.

Figure 14:
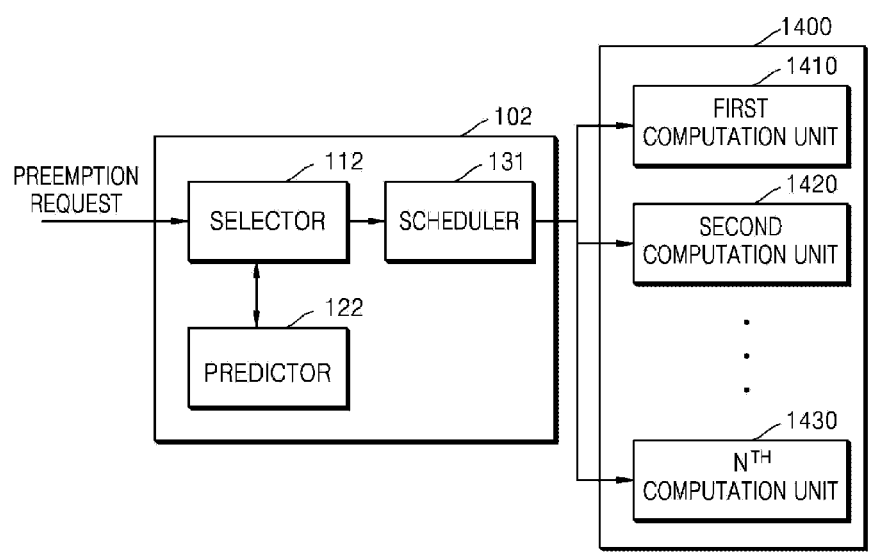
FIG. 14 is a diagram illustrating an example of an apparatus including an apparatus for selecting a preemption technique.

FIG. 14 is a diagram illustrating an apparatus including an apparatus for selecting a preemption technique.

Referring to FIG. 14, the system may include a preemption technique selecting apparatus 102 and a computation device 1400. Herein, the computation device 1400 may include a plurality of computation units 1410, 1420, and 1430.

Operations of the selector 112, the predictor 122, and the scheduler 131 included in the preemption technique selecting apparatus 102 illustrated in FIG. 14 have already been described with reference to FIGS. 1 through 13. The above descriptions of FIGS. 1 through 13, is also applicable to FIG. 14, and is incorporated herein by reference. Thus, the above description may not be repeated here.

The scheduler 131 assigns a second task to computation units to be preempted according to a preemption technique selected by the selector 112. The computation units to be preempted may be all or some of the computation units 1410, 1420, and 1430 included in the computation device 1400.

As described above, the preemption technique selecting apparatuses 100, 101, and 102 may select a proper preemption technique according to the first task currently being processed in the computation unit. Thus, the cost required for preemptive multitasking may be minimized.

Moreover, the preemption technique selecting apparatuses 100, 101, and 102 may select a preemption technique, preferentially taking account of a throughput overhead or a preemption latency according to the characteristics of a task. Hence, the preemption technique optimized for a type of the task may be selected.

The apparatuses, units, modules, devices, and other components illustrated that perform the operations described herein are implemented by hardware components. Examples of hardware components include controllers, sensors, generators, drivers and any other electronic components known to one of ordinary skill in the art. In one example, the hardware components are implemented by one or more processors or computers. A processor or computer is implemented by one or more processing elements, such as an array of logic gates, a controller and an arithmetic logic unit, a digital signal processor, a microcomputer, a programmable logic controller, a field-programmable gate array (FPGA), a programmable logic array, a microprocessor, an application-specific integrated circuit (ASIC), or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 12-13 that perform the operations described herein with respect to FIGS. 12-13 are performed by a processor or a computer as described above executing instructions or software to perform the operations described herein.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of selecting a preemption technique among different predetermined preemption techniques for a computation unit included in a processor in response to a preemption request to execute a second task before the computation unit finishes executing a first task, the method comprising:

receiving, by a selector, the preemption request, the preemption request including a preemption latency limiting condition or a throughput overhead limiting condition;

determining, by the selector, that all computation units of a plurality of computation units have been searched for preemption availability;

in response to determining that all computation units of the plurality of computation units are not available for preemption, selecting, by the selector, one or more computation units for preemption;

predicting, by a predictor, respective costs of each of the different predetermined preemption techniques based on a determined progress of the first task until receipt of the preemption request, wherein a cost of each different predetermined preemption technique is calculated based on a preemption latency or throughput overhead associated with a respective preemption technique of the different predetermined preemption techniques, and the different predefined preemption techniques include at least two of context switching, draining, and flushing;

transmitting, by the predictor, calculated costs of each of the different predetermined preemption techniques to the selector;

selecting, by the selector, one of the preemption techniques among the different predetermined preemption techniques based on the predicted costs of executing each of the different predetermined preemption techniques at a point in time of receipt of the preemption request;

notifying, by the selector, a scheduler of the selected one or more computation units and the selected preemption technique;

and assigning, by the scheduler, the second task to the selected one or more computation units according to the selected preemption technique.

2. The method of claim 1, wherein the preemption techniques comprise a first technique where information associated with the first task is stored and the first task is replaced with the second task;

a second technique where the second task is executed after execution of the first task is finished; and a third technique where the first task is immediately replaced with the second task without storing the information associated with the first task.

3. The method of claim 1, wherein the predicting of the respective costs comprises predicting a throughput overhead and a preemption latency for each of the preemption techniques.

4. The method of claim 1, wherein the selecting of the one preemption technique comprises selecting the one preemption technique having a determined smallest throughput overhead among the preemption techniques.

5. The method of claim 1, wherein the selecting of the one preemption technique comprises selecting the one preemption technique having a determined smallest preemption latency among the preemption techniques.

6. The method of claim 1, further comprising:

receiving a user input for selecting one of throughput overhead and preemption latency, wherein the selecting of the one preemption technique comprises selecting the one preemption technique having a determined lowest cost corresponding to the user input.

7. The method of claim 1, wherein the predicting of the respective costs comprises predicting the respective costs based on a number of Single Instruction Multiple Data (SIMD) instructions that have been executed in the first task and an average Instructions-Per-Clock (IPC) of the first task.

8. The method of claim 1, further comprising assigning the second task to a select one of plural computation units of the processor according to the selected one preemption technique.

9. The method of claim 1, wherein the receiving of the preemption request comprises receiving information regarding which kernel is to be preempted, how many computation units are to be preempted, and at least one of a preemption latency limiting condition or a throughput overhead limiting condition.

10. A non-transitory computer-readable recording medium having recorded thereon a program for executing the method of claim 1 on a computer.

11. The method of claim 1, wherein the preemption technique includes executing the first task, from a beginning of the first task, after completion of the second task.

12. An apparatus for selecting a preemption technique among different predetermined preemption techniques for a computation unit included in a processor in response to a preemption request to execute a second task before the computation unit finishes executing a first task, the apparatus comprising:

a selector configured to receive the preemption request, the request including a preemption latency limiting condition or a throughput overhead limiting condition, the selector configured for selection of one or more computations units for preemption in response to a determination that all computation units of a plurality of computation units are not available for preemption, and a predictor configured to predict respective costs of each of the different predetermined preemption techniques based on a determined progress of the first task until receipt of the preemption request, and the predictor configured to transmit calculated costs of each of the different predetermined preemption techniques to the selector, wherein the selector is further configured to select one of the predetermined preemption techniques among the different predetermined preemption techniques based on the predicted costs of executing each of the different predetermined preemption techniques at a point in time of receipt of the preemption request in which a cost of each different predetermined preemption technique is calculated based on a preemption latency or throughput overhead associated with a respective preemption technique of the different predetermined preemption techniques, and wherein the different predefined preemption techniques include at least two of context switching, draining, and flushing;

wherein the selector is further configured to notify a scheduler of the selected one or more computation units and the selected preemption technique, and the scheduler is configured to assign the second task to the selected one or more computation units according to the selected preemption technique.

13. The apparatus of claim 12, wherein the preemption techniques comprise a first technique where information associated with the first task is stored and the first task is replaced with the second task; a second technique where the second task is executed after execution of the first task is finished; and a third technique where the first task is immediately replaced with the second task without storing the information associated with the first task.

14. The apparatus of claim 12, wherein the predictor is further configured to predict a throughput overhead and a preemption latency for each preemption technique of the preemption techniques.

15. The apparatus of claim 12, wherein the selector is further configured to select the one preemption technique having a determined smallest throughput overhead among the preemption techniques.

16. The apparatus of claim 12, wherein the selector is further configured to select the one preemption technique having a determined smallest preemption latency among the preemption techniques.

17. The apparatus of claim 12, wherein the selector is further configured to receive a user input for selecting one of throughput overhead and preemption latency and to select the one preemption technique having a determined lowest cost corresponding to the user input.

18. The apparatus of claim 12, wherein the predictor is further configured to predict the respective costs based on a number of Single Instruction Multiple Data (SIMD) instructions that have been executed in the first task and an average Instructions-Per-Clock (IPC) of the first task.

19. The apparatus of claim 12, wherein the predictor is further configured to receive information comprising at least one of a processing-finished task, SIMD instruction progress statistics for each task, a start point of a non-idempotent region from the computation unit and to predict the respective costs based on the received information.

20. The apparatus of claim 12, further comprising a scheduler configured to assign the second task to at least one computation unit according to the selected preemption technique.

* * * * *